April 1, 1952      F. JONKER      2,591,549
ROTATING CONTINUOUS COMBUSTION TYPE COMBUSTION
PRODUCTS GENERATOR AND REACTION TURBINE
Filed May 17, 1948      4 Sheets-Sheet 1
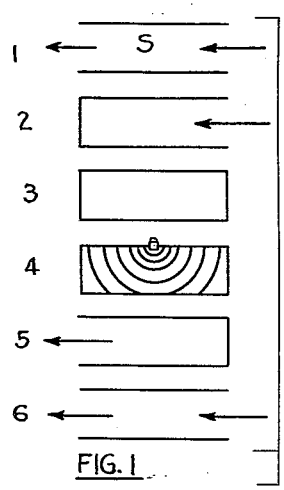
FIG. 1
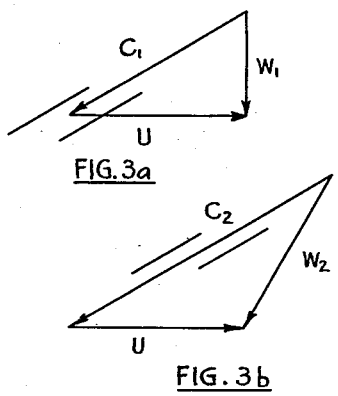
FIG. 3a
FIG. 3b
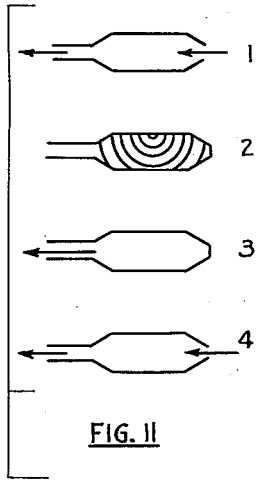
FIG. 11
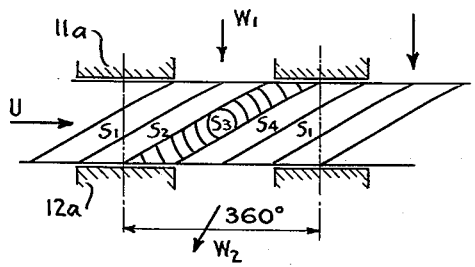
FIG. 2
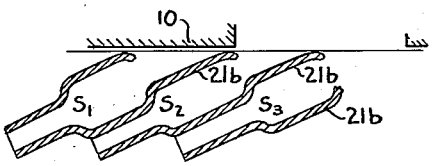
FIG. 12
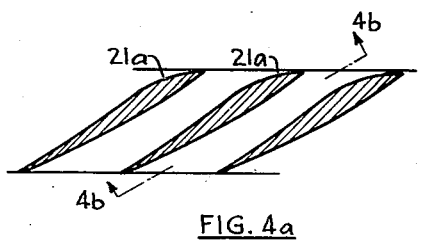
FIG. 4a
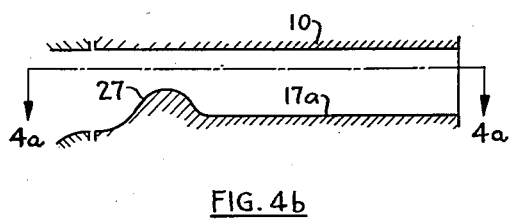
FIG. 4b
INVENTOR:
FRITS JONKER
BY Oswald H. Milmore
HIS ATTORNEY INVENTOR:
FRITS JONKER
BY: Oswald H. Milmore
HIS ATTORNEY April 1, 1952   F. JONKER   2,591,549
ROTATING CONTINUOUS COMBUSTION TYPE COMBUSTION
PRODUCTS GENERATOR AND REACTION TURBINE
Filed May 17, 1948   4 Sheets-Sheet 3

INVENTOR:
FRITS JONKER
BY: *Oswald H. Wilmore*
HIS ATTORNEY

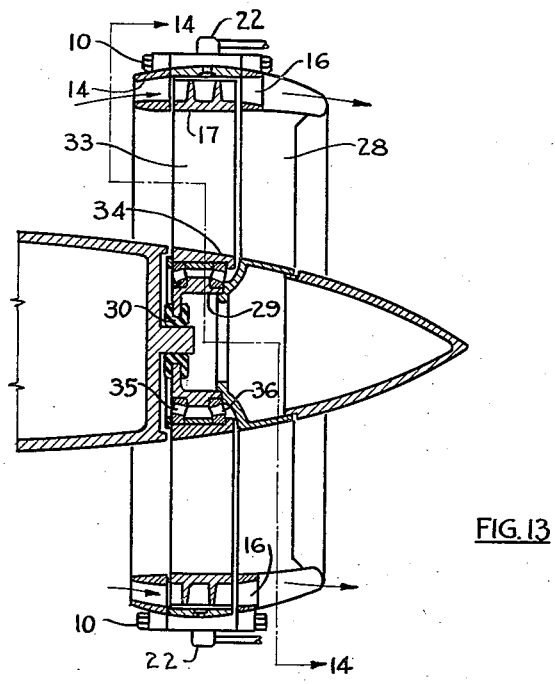
FIG. 13
FIG. 15
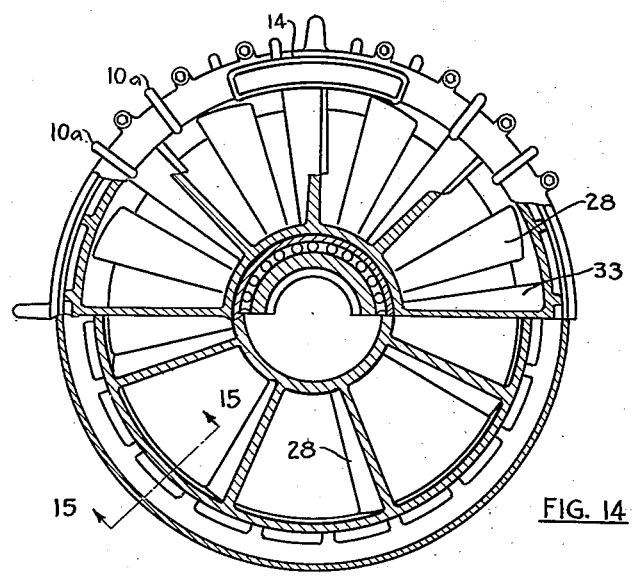
FIG. 14
INVENTOR:
FRITS JONKER
BY: Oswald H. Milmore
HIS ATTORNEY Patented Apr. 1, 1952

2,591,549

UNITED STATES PATENT OFFICE 2,591,549

ROTATING CONTINUOUS COMBUSTION TYPE COMBUSTION PRODUCTS GENERATOR AND REACTION TURBINE

Frits Jonker, Delft, Netherlands, assignor to Shell Development Company, San Francisco, Calif., a corporation of Delaware Application May 17, 1948, Serial No. 27,495
In the Netherlands June 4, 1947

17 Claims. (Cl. 60—39.35)

This invention relates to internal combustion reaction turbines and turbo-propellers.

Explosion turbine (i. e., turbines wih intermittent combustion) are already known which make use of the reaction principle for the conversion of the energy of the combustion gases into mechanical energy. However, these known turbines present many drawbacks, such as complicated and unreliable explosion chambers with valves and other moving accessories, unreliable ignition devices, cooling difficulties, impossibilities of applying high circumferential velocities, resulting in low output and low power.

It is an object of this invention to provide an improved reaction combustion turbine characterized by simplicity, reliability, light weight and low cost. A further object is to obviate the difficulties above enumerated.

A specific object is to provide an inexpensive reaction combustion turbine suitable for applications where high power output during short periods is required, e. g., to start diesel engines or other reciprocating internal combustion engines during cold weather, or all sorts of machinery that is too heavy for operation by hand. A further specific object is to provide an improved, light weight reaction combustion turbine which may be applied for aircraft, either for driving the propeller or for temporarily increasing the torque applied thereto.

Further objects of the invention will be apparent from the following description, taken in connection with the accompanying drawings illustrating certain embodiments thereof, and forming a part of this specification, wherein:

Figure 1 is a schematic diagram representing the working space in successive stages of the cycle and illustrating the principle of operation as indicated by the numbers;

Figure 2 is a diagrammatic developed view of the rotor periphery, the blades being indicated by single lines;

Figures 3a and 3b are velocity diagrams for the intake and exhaust ports, respectively;

Figure 4a is a developed sectional view through the rotor blades, taken on a cylindrical surface looking toward the rotor axis, and corresponding to section 4a—4a on Figure 4b, showing a preferred form of the working spaces;

Figure 4b is a helical section through one of the working spaces, taken on line 4b—4b of Figure 4a;

Figure 11 is a schematic diagram representing the working space in successive stages of the cycle and illustrating the principle of operation according to a slightly modified form;

Figure 12 is a developed view of the rotor periphery of a modified construction suitable for the operation illustrated in Figure 11;

Figure 13 is a longitudinal sectional view of the turbine as applied to an aircraft;

Figure 14 is a transverse sectional view taken on broken section line 14—14 of Figure 13; and Figure 15 is a longitudinal sectional view taken on line 15—15 of Figure 14.

Figure 5:
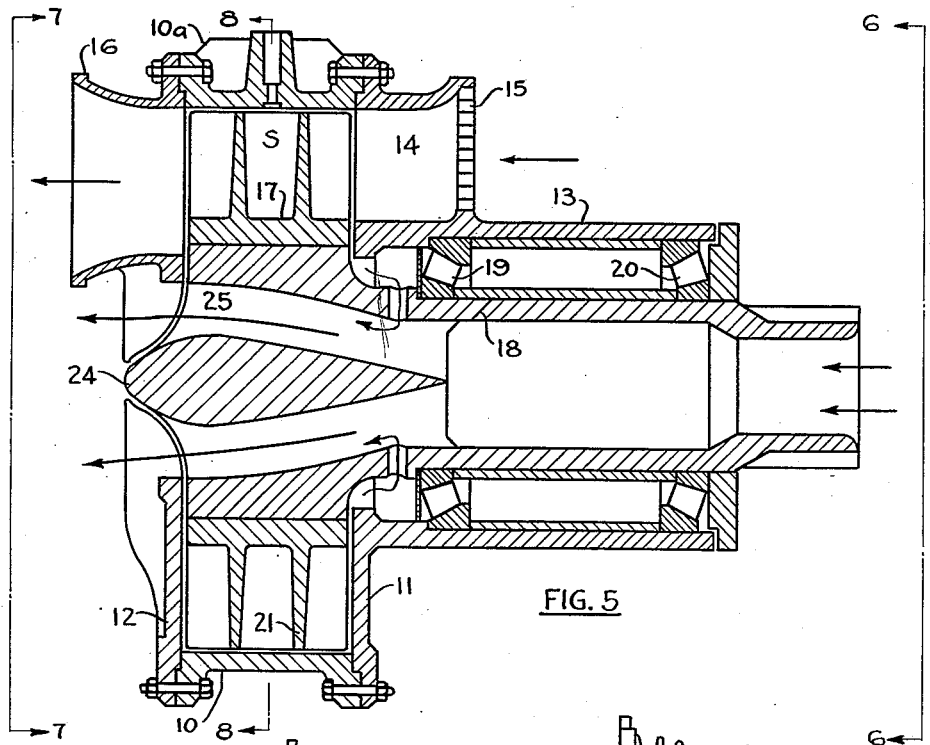
Figure 5 is a longitudinal sectional view through a turbine constructed according to the invention.

In accordance with the present invention, combustion is effected in helical working spaces arranged on the periphery of a rotor mounted within a casing, combustion being alternated with a cooling air-flow. The rotor is driven by reaction of the combustion gases in flowing out of the working spaces, by virtue of the helical arrangement of blades formed on the rotor and separating adjacent working spaces.

The working spaces extend helically about the rotor axis, and are bounded: laterally by blades on the rotor; at their bases by the rotor body; and at their radially outer limits by the casing or, optionally, by an annular wall on the casing which may, if provided, be perforated to permit the introduction of fuel from the casing radially inwardly into the working spaces. For economy in manufacture and to save weight, however, I prefer to omit such outer wall on the rotor and use the annular casing as the outer wall of the combustion or working spaces. While I may introduce fuel into the working spaces in a variety of ways, e. g., through the rotor, or at the air intake, I prefer to inject fuel through one or more injectors more or less radially inwardly through the annular casing wall, whereby continuous injection of fuel may take place without recourse to elaborate timing mechanism, and this arrangement constitutes an important feature of the invention.

The casing and rotor are arranged so that the working spaces are closed at least at the intake end during part of the cycle of operation, viz., during part of the rotary movement of the rotor, and the casing is provided with an air intake port at or near the intake end of the working space for intermittent registry with the working spaces. While I may place the air intake port in the annular or side wall of the casing and provide a rotor with working spaces which are always closed at their intake ends (by means of imperforate end walls on the rotor or casing) I prefer, with a view to minimizing resistance to air flow, to provide an end wall for the casing at the intake end and form an air intake port through said end wall for intermittent registry with the intake ends of the helical working spaces, whereby the air enters the working spaces from the ends instead of radially at such ends.

The working spaces may be either continuously open at their exhaust ends (as described hereafter in connection with Figures 11 and 12), or may be intermittently in registry with an exhaust port in the casing, e. g., in a second end wall at the exhaust end of the casing (as described with reference to Figures 1 and 2).

The principle of operation as shown in Figure 1, is as follows: A given working space s, delimited by two adjacent turbine blades, the rotor and the turbine casing, is initially open at both ends, as shown in stage 1, permitting the free passage of cooling air therethrough. The cycle of any given working space thus starts with ventilation of the working space s by the fan action of the rotor itself aided, in the case of installation in a moving vehicle, e. g., an aeroplane, by the ram effect of air pressure against the front end, or by an external compressor or fan blade. By rotation of the turbine rotor the rear or exhaust end of the space (appearing to the left) is closed, as shown in the second stage, in view of the exhaust end of the working space passing out of the registry with the exhaust port in the casing. Air is thereby trapped within the space to a pressure depending upon the velocity of air flow. Through continued rotation of the rotor the front or intake end of the space s is next shut off as the space moves out of registry with the air intake port (stage 3). Fuel is next supplied into the space s, for example, through an injector mounted in the stationary casing wall, and ignited (stage 4). After ignition the working space is again in registry with the exhaust port in the rear, permitting the discharge of combustion gases at very high velocity (stage 5). Continued rotation again places the working space into registry with the air intake port, permitting renewed ventilation (stage 6, corresponding to stage 1). After ventilation the cycle is repeated.

Figures 6, 7:
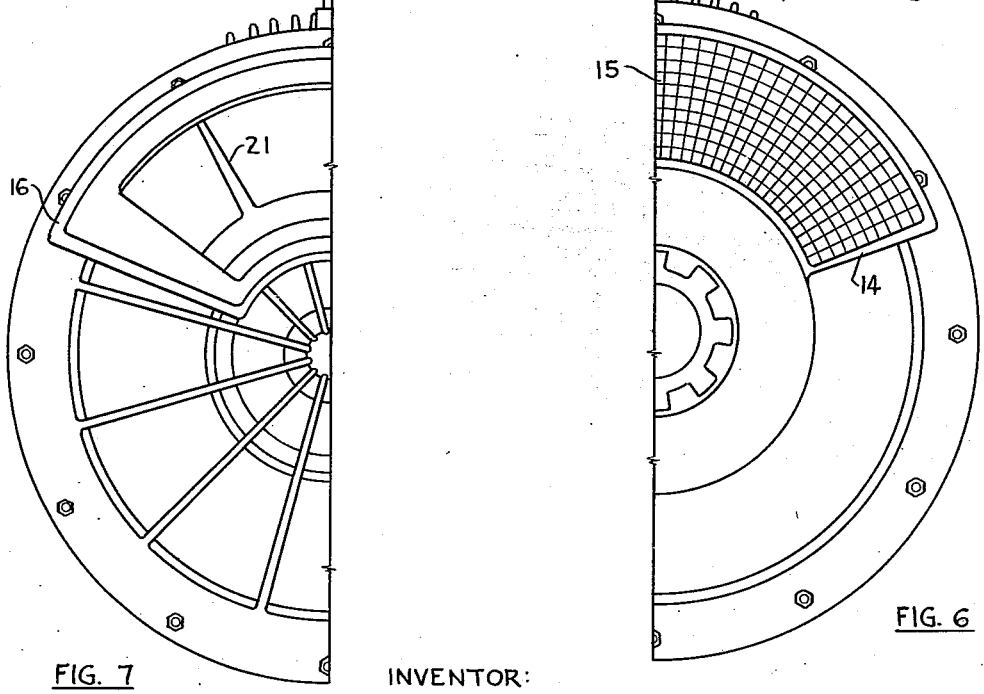
Figures 6 and 7 are a partial front end and a partial rear end view, respectively, of the turbine as seen from the correspondingly numbered arrows shown in Figure 5.
Figure 8:
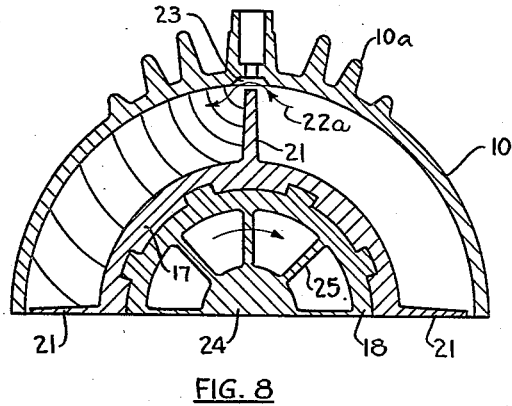
Figure 8 is a partial transverse sectional view taken on line 8—8 of Figure 5.
Figure 9:
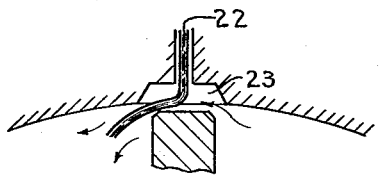
Figure 9 is an enlarged view of a portion of Figure 8 showing the fuel supply port and the recess.
Figure 10:
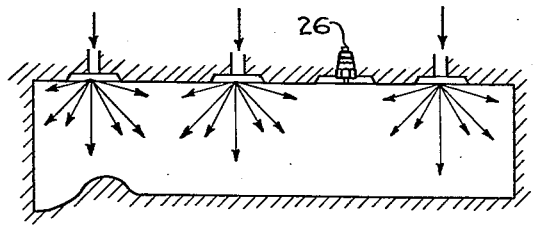
Figure 10 is a helical sectional view through one of the working spaces, similar to Figure 4b, showing one arrangement of the fuel injectors.

Referring to Figures 5 to 10, there is shown a turbine operating according to the principle illustrated in Figure 1, having a stationary turbine casing with an annular wall 10, provided with cooling fins 10a and bolted to front and rear cover plates 11 and 12 forming annular end walls. The front cover has a cylindrical extension 13 and is, further, provided with an air intake duct 14 at the rear end of which the wall 11 is cut away to form an intake port communicating with the inside of the casing. The duct and port may extend circumferentially for slightly less than a half circle, e. g., 160° as shown in Figure 6 and may be, optionally, provided with a grille 15. The rear cover 12 has an exhaust port in alignment with the intake port and of about the same extent, e. g., 160°. This port is at the front end of a discharge or jet tube 16, which may optionally be flared to expand the exhaust gases. The rotor 17 is rotatably mounted in the casing by means of a tube 18, keyed to the rotor, and supported by rollers 19 and 20 on the extension 13. The rotor has turbine blades 21 arranged helically about the rotor axis and providing a plurality, e. g., four, helical working spaces s. The pitch of the blades is such that the opposite ends of any working space can be brought into registry with the intake and exhaust ports in the end walls in the sequence described above with reference to Figure 1; the pitch will be evident from Figure 2, from which it will be seen that each blade traverses less than 360°, e. g., about 270°. One or more fuel injection nozzles 22, which may be fitted with atomizers, e. g., of the type which atomize liquid fuel, or gas injectors, connected to a source of fuel, not shown, are mounted in the casing wall. The injectors are located to be in communication with any given working space after the intake end has passed out of registry with the intake port, although the exact instant of establishment of communication will depend upon the speed of combustion and speed of operation of the turbine. When a plurality of injectors is used, as shown in Figure 10, they are arranged on the casing wall along a helical line so that all injectors will be in communication with the same working space. Recesses 23 are formed in the casing wall about the injectors to permit flame to pass around the edge of a turbine blade from one working space into a succeeding space as indicated by the arrow 22a. These recesses are preferably located only around each injector as shown in Fig. 10 to insure ignition of the fuel jet, but may be continuous grooves of helical shape connecting the several injectors, or located some distance away from the injectors, as desired.

The rotor 17 is comparable to an axial fan with short blades. When it rotates, a strong current of air is set up by the rotor as a result of its fan action, at least when both ends of the working spaces are in registry with the ports in the end walls. With this construction the circumferential velocity of the tip of the blades may approach the speed of sound without giving rise to difficulties. The rotor is preferably made of special gas turbine blade material which is capable of withstanding very high permanent loads even at temperatures exceeding 800° C. Cooling is effected during the ventilating state (stages 1 and 6 in Figure 1).

Cooling is further provided by the cooling fins 10a and by air flow through the tube 18, the bore of which is enlarged inside the rotor and provided with a stream-lined body 24 supported by radial fins 25. Cooling air is caused to flow through the tube 18 by the exhaust of combustion gases at very high speed through the discharge tube 16. I may, however, form the fins 25 as fan blades, thereby greatly increasing the flow of cooling air. The blades 25 cause sufficient transfer of heat to the cooling air to maintain the rotor at safe operating temperatures.

The operation of the turbine is as follows: When a blade 21 passes the injector 22, the working space on its trailing side has just been or is being shut off from the intake port, and the jet of fuel, which previously was flowing into the preceding working space, begins to flow into said space on the trailing side. At or about the same time, the said blade passes the recess 23, permitting a small portion of the gases still burning will flow from the preceding working space via the recess into the succeeding working space now being supplied with fuel as indicated in Figures 8 and 9, as a result of which the fuel jet is ignited and at the same time atomized into the latter space. Although the combustion takes place intermittently in each individual working space, the fuel is thus burned continuously. Owing to the absence of any ignition delay and the excellent atomization and mixing possible in such a construction, the combustion takes place within the very short period of time required, making it even possible to run the turbine on heavy or low quality fuels. For initial starting, any means for effecting rotation of the rotor may be utilized, such as, for example, a rope wound about a pulley, such as is commonly used for starting outboard motors. A continuously sparking spark plug 26 may be energized during the starting, although any other means of effecting initial combustion may be used.

As heretofore explained, continued rotation of the rotor brings the exhaust end of the working space wherein combustion is taking place into registry with the exhaust port, resulting in the rearward discharge of combustion products at very high velocity. The cycle of operation and the manner in which the flow of gases reacts on the turbine blades will be apparent from Figures 2, 3a and 3b. In these figures $W_1$ and $W_2$ represent the absolute velocities of the inflowing working media, viz., of the inflowing air and outflowing combustion products, respectively; U is the circumferential velocity of the rotor; and $C_1$ and $C_2$ represent the velocities of inflowing and outflowing working media, respectively, relative to the rotor.

In Figure 2, the shaded walls $11a$ and $12a$ represent end walls (such as the walls 11 and 12 respectively of Figure 5) and the spaces $s_1$ to $s_4$ represent four working spaces of a rotor with four blades. Space $s_1$ is being ventilated; $s_2$ is being charged with air; $s_3$ is being supplied with fuel and ignition is beginning therein; $s_4$ is discharging combustion products through the discharge port. The reaction of the combustion gases on the turbine blades is evident from the intake and exhaust velocity vector diagrams in Figures 3a and 3b, respectively. Thus, the rotor velocity U is the same in both figures, but the vector $W_1$ is changed both in magnitude and direction into $W_2$. The discharging combustion gases have, therefore, acquired a velocity component parallel to U in a direction opposite to U. This velocity component was acquired by acting circumferentially on the blades, thereby causing rotation of the rotor.

For attaining a high output and high power it is desirable to shape the working spaces with a constriction intermediate its ends, and to provide an expanding or flaring section toward the discharge end, in the manner well understood for gas expansion nozzles. A preferred construction for this purpose is shown in Figures 4a and 4b, wherein the rotor $17a$ has blades $21a$ which are widest at their intake ends, tapering toward both ends but tear-drop shaped at their intake ends, to provide working spaces which become circumferentially wider toward the exhaust end. The base of the rotor is provided with a raised portion or rounded ridge 27 to reduce the cross section of the working space, the base of the rotor being sloped toward the rotor axis beyond the ridge to provide a definite flare.

As previously indicated, it is also possible to discard the rear casing cover 12 and have the combustion take place in working spaces which are continuously open to the rear. For this arrangement the working cycle of the turbine is illustrated diagrammatically in Figure 11, wherein the first stage represents the ventilating stage, with both ends open; stage 2 the fuel supply and ignition stage, with only a relatively small amount of exhaust; stage 3 the main exhaust stage; and stage 4, corresponding to the first stage, the ventilating stage. When using this simplified form it is preferable to provide elongated constricted outlets for the working spaces having cross sectional areas less than those of the anterior combustion spaces; such outlets may be cylindrical or flared. One such embodiment is shown in Figure 12, wherein the working spaces $s_1$, $s_2$ and $s_3$ are delimited by blades $21b$ shaped to provide the constricted outlets.

As indicated above, the turbine according to the invention may operate on heavy or cheap fuels. This possibility, the low cost of the engine, the parts of which do not have to be machined or fitted with great accuracy, and the high power-to-weight ratio, constitute attractive features of the turbine described, which may, under certain conditions, counterbalance the high fuel consumption. The turbine is intended mainly for supplying high power during a short period, for example, in starting or reversing marine engines, or other machinery that cannot be conveniently turned by hand, or for assiting other motors or engines during temporary periods when high power output is required. In such cases the turbine may operate under a very heavy load for a short time, viz., until the rotor temperature exceeds 800° C.; in this way the heat capacity of the turbine serves to accumulate heat. The invention is not, however, limited to the construction of inexpensive engines with loosely fitting parts and high fuel consumption; thus, it is possible to apply the principle to engines which are designed for high operating efficiencies.

For continuous operations, the turbine should be operated under smaller loads, and a stronger current of cooling air, both through the hollow tube 18 and through the working spaces, and/or more prolonged ventilating periods are desirable. This can be effected by providing fan blades for the supports 25 and by making the intake and exhaust ports in the end walls (or, in the case of the form according to Figures 11 and 12, the intake port) extend a greater circumferential distance to prolong the the ventilating period.

One specific application of the turbine is illustrated in Figures 13 and 14, wherein it is adapted to give an inexpensive propeller-drive for aircraft. In this embodiment the turbine, with its casing 10, cooling fins $10a$, end walls 11 and 12, and rotor 17, is mounted in the tail of an aircraft.

The propelling mechanism is, in this case, of a form between an open fan and a directed fan. This propulsive unit has both fixed and moving blades; the former, shown at 28, form one unit with the rear end wall or cover plate 12, and are supported by a hub 29 secured to the rear of the aircraft by means of an annular-shaped rubber mounting 30. A sheet iron cowling 31 in rear of the casing 10 permits cooling air to flow along the rear cover plate 12, as shown by the arrows 32 (Figure 15) to cool the plate. The rotor 17 is fixed to propeller blades 33, connected at their inner ends to a ring 34, supported through tapered roller bearings 35 and 36 by the hub 29, The annular wall 10 of the casing and the front cover 11 are riveted to the rear plate 12. Four air intake ducts 14 and four exhaust ducts 16, are provided opposite corresponding intake and exhaust ports in the end walls, which extend circumferentially through about 40°. Fuel injectors 22 are provided at four equally spaced points in the casing 10, between corresponding intake and exhaust ports. The rotor 17 carries sixteen blades, with a pitch such that each blade extends through about 70°. In this way each working space may be ventilated through an intake duct and an exhaust duct spaced 90° from the intake duct. Figure 2 still shows the principle of operation, the angle 90° being substituted for "360°."

This arrangement insures maximum turbine efficiency and minimum propeller dimensions. The heat load of the turbine does not restrict the output of the turbine, because the whole device is cooled in an ideal manner by the air stream generated by the propeller and the forward speed of the aeroplane.

I claim as my invention:

1. A reaction combustion turbine comprising a casing having an intake end and an exhaust end and comprising an annular wall, a rotor mounted for rotation within said casing, peripheral blades on said rotor disposed helically about the rotor axis defining a plurality of helical working spaces therebetween, an air intake port in said casing positioned for intermittent registry with each of said working spaces substantially at one end thereof, said casing and rotor being arranged to close the working spaces at their intake ends when not in registry with said intake port and to provide an exhaust passageway from said working spaces substantially at the ends away from said intake ends that opens each working space at least during a part of the time that the air port is in registry with the respective working space for the passage of cooling air through said space and also at least during a part of the time that the air intake port is out of registry with the respective working space for the discharge of combustion products at high velocity to impart a driving torque to the rotor, and means for supplying fuel directly into said working spaces for admixture with air therein.

2. The turbine according to claim 1 wherein the said helical working spaces have substantially the same pitch at their inlet and discharge ends and the exhaust passageway is arranged to communicate with the ends of the working spaces.

3. The turbine according to claim 1 wherein the exhaust end of the casing is open opposite the exhaust ends of the working spaces at all positions of the rotor.

4. The turbine according to claim 3 wherein the working spaces are shaped to provide an enlarged combustion space near the intake end and a restricted discharge channel toward the exhaust end.

5. The turbine according to claim 1 wherein the working spaces are at least partially bounded by said annular wall, and said wall is provided with recesses in its inner face to permit flame to pass from one working space over the radially outer edge of a peripheral blade bounding said space into an adjacent working space.

6. The turbine according to claim 1 wherein said helical working spaces are provided with a constriction intermediate their ends and with a widening portion at their exhaust ends.

7. The turbine according to claim 6 wherein said peripheral blades are wider at the intake ends than at the exhaust ends, whereby the widths of the working spaces increase toward said exhaust end, and the face of the rotor forming the base of the working spaces has a protrusion intermediate the ends of the working spaces to provide said constriction.

8. The turbine according to claim 1 wherein said rotor has a bore open at the ends providing a passageway for the flow of cooling air.

9. In combination with the turbine according to claim 8, a streamlined body within said bore at least opposite said blades to provide an annular passage for the flow of cooling air, and radial fins connecting said body to the rotor.

10. A reaction combustion turbine comprising a casing having an intake end and an exhaust end and comprising an annular wall, a rotor mounted for rotation within said casing, peripheral blades on said rotor disposed helically about the rotor axis defining a plurality of helical working spaces therebetween, an air intake port in said casing positioned for intermittent registry with each of said working spaces substantially at one end thereof, said casing and rotor being arranged to close the working spaces at their intake ends when not in registry with said intake port and to provide an exhaust passageway from said working spaces substantially at the ends away from said intake ends that opens each working space at least during a part of the time that the air intake port is out of registry with the respective working space for the discharge of combustion products at high velocity to impart a driving torque to the rotor, said working spaces being at least partially bounded by the said annular wall of the casing, and one or more fuel injectors mounted in said annular wall for successive communication with the working spaces upon turning of the rotor, the fuel injectors being located circumferentially so as to communicate with each working space when the respective space is out of registry with said intake port.

11. The reaction turbine according to claim 10 wherein the part of the inner face of the annular wall that surrounds the fuel injector is provided with a small recess for permitting flame to pass from one working space into an adjacent working space when the peripheral blade passes the fuel injector.

12. A reaction combustion turbine comprising a casing having an intake end and an exhaust end and comprising an annular wall and an end wall at the intake end, a rotor mounted for rotation within said casing, peripheral blades on said rotor disposed helically about the rotor axis defining a plurality of helical working spaces therebetween having substantially the same pitch at their intake and exhaust ends, an air intake port in said end wall of the casing positioned for intermittent registry with each of said working spaces at one end thereof, said casing and rotor being arranged to provide an exhaust passageway from said working spaces at the ends away from said intake ends that opens each working space at least during a part of the time that the air intake port is out of registry with the respective working space for the discharge of combustion products at high velocity to impart a driving torque to the rotor, and means for supplying fuel directly into said working spaces for admixture with air therein.

13. The turbine according to claim 12 wherein the casing is provided with an end wall also at the exhaust end and the said exhaust passageway comprises a port in said end wall at the exhaust end located opposite the exhaust ends of the working spaces, said casing and rotor being arranged for intermittent registry of the exhaust passageway with said working spaces.

14. A reaction combustion turbine comprising a casing having an annular wall and end walls, a rotor mounted for rotation within said casing, peripheral blades on said rotor disposed helically about the rotor axis substantially to the casing wall and defining a plurality of helical working spaces between the blades and between the rotor and the casing, an air intake port in one end wall and an exhaust port in the other end wall, said ports being positioned eccentrically with respect to said rotor axis for intermittent registry with the ends of said working spaces and being positioned circumferentially so that, in the course of progressive rotation of the rotor, each working space is, successively, in registry with both ports, in registry only with the intake port, closed at both ends, and in registry only with the exhaust port, means for supplying fuel directly to said working spaces through said casing, and means for successively igniting the fuel within said working spaces.

15. The turbine according to claim 14 wherein the means for supplying fuel comprises one or more fuel injectors mounted in said annular wall for successive communication with the working spaces when out of registry with said intake and exhaust ports.

16. The turbine according to claim 14 wherein the means for successively igniting the fuel within said working spaces comprises a recess in the inner space of said annular wall to permit flame to pass from one working space into an adjacent working space around the end of the helical blade separating said working spaces.

17. The turbine according to claim 16 wherein said recess is disposed in the vicinity of the fuel injector.

FRITS JONKER.

REFERENCES CITED

The following references are of record in the file of this patent:

UNITED STATES PATENTS

| Number | Name | Date |
|---|---|---|
| 1,187,298 | Fujita | June 13, 1916 |
| 1,569,607 | Beck | Jan. 12, 1926 |
| 1,929,778 | Goddard | Oct. 10, 1933 |
| 2,395,404 | Goddard | Feb. 26, 1946 |
| 2,410,538 | Walton | Nov. 5, 1946 |

FOREIGN PATENTS

| Number | Country | Date |
|---|---|---|
| 30,757 | Sweden | May 6, 1911 |
| 358,514 | Great Britain | Oct. 1, 1931 |
| 469,180 | Great Britain | July 20, 1937 |
| 471,671 | Great Britain | Sept. 8, 1937 |
| 844,442 | France | Apr. 24, 1939 |